(12) United States Patent
Yoshida et al.

(10) Patent No.: US 8,434,815 B2
(45) Date of Patent: May 7, 2013

(54) VEHICLE INNER PANEL

(75) Inventors: Masatoshi Yoshida, Kobe (JP); Koji Fukumoto, Kobe (JP); Koki Ikeda, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 219 days.

(21) Appl. No.: 12/681,794

(22) PCT Filed: Oct. 9, 2008

(86) PCT No.: PCT/IB2008/002666
§ 371 (c)(1),
(2), (4) Date: Apr. 6, 2010

(87) PCT Pub. No.: WO2009/047621
PCT Pub. Date: Apr. 16, 2009

(65) Prior Publication Data
US 2010/0244494 A1    Sep. 30, 2010

(30) Foreign Application Priority Data

Oct. 11, 2007 (JP) ................................. 2007-265944

(51) Int. Cl.
*B62D 25/10*    (2006.01)
(52) U.S. Cl.
USPC ................................. 296/193.11; 296/187.04
(58) Field of Classification Search ............. 296/193.11, 296/187.04, 187.09; 180/69.2, 69.21
See application file for complete search history.

(56) References Cited

U.S. PATENT DOCUMENTS 7,150,496 B2 * 12/2006 Fujimoto ................. 296/187.04

FOREIGN PATENT DOCUMENTS

| JP | 8-318875 | 12/1996 |
|---|---|---|
| JP | 2001-151159 | 6/2001 |
| JP | 2003-205866 | 7/2003 |
| JP | 2004-26120 | 1/2004 |
| JP | 2006-44542 | 2/2006 |
| JP | 2006-44543 | 2/2006 |
| JP | 2006-273198 | 10/2006 |
| JP | 2007-182135 | 7/2007 |

OTHER PUBLICATIONS

Notification of Reason(s) for Refusal for JP Appl. No. 2007-265944 dated Jul. 26, 2011.

* cited by examiner

*Primary Examiner* — Joseph Pape
(74) *Attorney, Agent, or Firm* — Finnegan, Henderson, Farabow, Garrett & Dunner, LLP

(57) ABSTRACT

A plurality of beads (2) extending in the vehicle longitudinal direction are formed parallel to each other lined up in the vehicle width direction on an inner panel (1). Accordingly, an upper flange (5), a vertical wall (4), a lower flange (3), and a vertical wall (4) are formed connected in this order at a cross-section in the vehicle width direction. The vertical wall (4) includes a lower vertical wall (4a) and an upper vertical wall (4b), and there is a bend line (4c) at the boundary between the two which is bent. The inclination angle of the upper vertical wall (4b) is between 30° and 60° inclusive, which is greater than the inclination angle of the lower vertical wall (4a). The bend line (4c) is positioned more than ½ way up between the lower flange (3) and the upper flange (5) so as to be closer to the upper flange (5) than the lower flange (3).

13 Claims, 6 Drawing Sheets

VEHICLE INNER PANEL

CROSS-REFERENCE TO RELATED APPLICATIONS

This application is a national phase application of International Application No. PCT/IB2008/002666, filed Oct. 9, 2008, and claims the priority of Japanese Application No. 2007-265944, filed Oct. 11, 2007, the contents of both of which are incorporated herein by reference.

BACKGROUND OF THE INVENTION

1. Field of the Invention

The invention relates to a vehicle inner panel that is underneath and overlaps with an outer panel on the outside of a hood of a vehicle or the like. More particularly, the invention relates to a vehicle inner panel for improved pedestrian protection with respect to the head of a pedestrian in a frontal collision.

2. Description of the Related Art

In a vehicle provided with a hood on the front portion of the vehicle body, the vehicle hood is made of an outer panel, an inner panel, and other reinforcing members and the like. In order to ensure the rigidity and strength of the hood itself, the outer panel and the inner panel are typically joined so as to form a structure with a closed cross-section and a space in between the two panels.

Japanese Patent Application Publication No. 2001-151159 (JP-A-2001-151159) and Japanese Patent Application Publication No. 2003-205866 (JP-A-2003-205866) describe a structure of a related roof which ensures dent resistance and tensile strength required for hoods while increasing pedestrian protection performance during a frontal collision by forming a plurality of beads having U-shaped cross-sections generally parallel with each other near the center of the inner panel.

Currently, a HIC (Head Injury Criteria) value calculated from an Acceleration—Time waveform at impact is typically used to evaluate pedestrian protection performance during a frontal collision. A lower HIC value indicates a lower risk of injury to the head of a pedestrian during a collision. Therefore, as described above, a hood structure with a low HIC value is desirable after ensuring dent resistance and tensile strength.

The acceleration waveform with respect to the head when the head collides with an area of the hood near the center is such that a first wave is generated when the head contacts the hood at the onset of the collision, and then a second wave is generated when the hood portion that has been pressed against by the head moves downward and contacts internal parts such as the engine arranged underneath the hood.

The HIC value can be effectively lowered by reducing the second acceleration wave in particular. Therefore, during head impact, the hood needs to absorb the impact energy before it contacts the internal parts. Thus it is desirable to have sufficient space between the hood panel and the internal parts.

However, when considering the fact that parts necessary for a vehicle are housed within a limited space under the hood, it is often difficult to ensure sufficient space between the hood panel and the internal parts.

Therefore, it is preferable to make a hood structure that either reduces the deformation stroke by making the first acceleration wave during a head impact as large as possible and increase the amount of energy absorbed at the onset of the collision, or reduces the second acceleration wave generated when the hood contacts the internal parts.

With the foregoing hood inner structure in which a plurality of beads having U-shaped cross-sections are formed parallel with one another, the beads increase the flexural rigidity of the hood panel, thereby suppressing bending deformation during impact with the head of a pedestrian so the impact load can be dispersed. Therefore, the area displaced by the head impact, and thus the weight, increases compared with when the beads are not provided, so the first acceleration wave during a head impact increases. Also, because the beads are formed generally parallel with one another, the hood more easily deforms when it contacts the internal parts, thereby reducing the second acceleration wave.

However, with the requirements with respect to pedestrian protection becoming increasingly stringent, further improvements in pedestrian protection performance are desired.

Therefore, to further improve pedestrian protection performance, Japanese Patent Application Publication No. 2006-44542 (JP-A-2006-44542) proposes a hood inner structure in which the beads having U-shaped cross-sections are provided as described above, wherein the height of the U-shaped cross-section is changed depending on the portion taking into account actual impact conditions, and Japanese Patent Application Publication No. 2006-44543 (JP-A-2006-44543) a hood inner structure in which the beads having U-shaped cross-sections are provided as described above, wherein a flat part is provided midway in the vertical walls of the U-shaped cross-sections.

However, in such U-shaped cross-section bead structures, in order to further increase the first acceleration wave, it is necessary to disperse the stress not only in the direction along the beads, but also in a direction orthogonal to the beads. Further, it is desirable to increase the deformation rigidity of the beads so that localized deformation does not occur during a head impact from above the vehicle. At the same time, in order to reduce the second acceleration wave, it is desirable to have an easily deformable structure with a low deformation load with respect to a load applied from below the vehicle upon contact with internal parts. However, no related art has been able to meet these needs.

SUMMARY OF THE INVENTION

This invention thus provides a vehicle inner panel having superior pedestrian protection performance by resisting deformation when a load is applied from above the vehicle to the inner panel upper surface, thereby making the first acceleration wave larger, while reducing the deformation load during contact between the inner panel and an internal part beneath the hood, such as an engine, in the later stage of a collision.

A first aspect of the invention relates to a vehicle inner panel which, together with an outer panel, forms a vehicle hood. This vehicle inner panel includes a plurality of beads having at least convex or concave cross-sections, which are formed parallel with one another and extending the longitudinal direction of the vehicle. Each bead includes a vertical wall, a lower flange that extends from a bottom edge of the vertical wall, and an upper flange that extends from an upper edge of the vertical wall. The vertical wall, the lower flange, the vertical wall, and the upper flange are shaped so as to be successively connected at a cross-section orthogonal to the direction in which the beads are lined up. The vertical wall is formed from an upper vertical wall and a lower vertical wall that is below and bent with respect to the upper vertical wall. An inclination angle of the upper vertical wall with respect to the upper flange is greater than an inclination angle of the lower vertical wall with respect to the upper flange. Moreover, the upper flange is joined to the outer panel.

In the first aspect described above, the inner panel may have a bottom portion and a bead forming surface that is connected to the upper edge of the vertical wall that rises from the bottom portion, and the beads may be such that, at the cross-section orthogonal to the direction in which the beads are lined up, beads having concave cross-sections are formed at appropriate intervals on the bead forming surface of the inner panel (1).

In the first aspect described above, the beads may be such that a bead having a convex cross-section and a bead having a concave cross-section are formed alternately at the cross-section orthogonal to the direction in which the beads are lined up.

In the first aspect described above, the inner panel may have a bead forming surface that connects with a bottom edge of the vertical wall, and the beads may be such that beads having convex cross-sections are formed at appropriate intervals on the bead forming surface of the inner panel at a cross-section orthogonal to the direction in which the beads are lined up.

In the foregoing structure, a bent portion between the upper vertical wall and the lower vertical wall of the beads may be positioned more than ½ way between the lower flange and the upper flange so as to be closer to the upper flange than the lower flange. Also, the bent portion may be positioned ⅓ of the way between the lower flange and the upper flange so as to be closer to the upper flange than the lower flange.

In the foregoing structure, the angle formed between the upper vertical wall and the upper flange may be between 40° and 60° inclusive.

In the foregoing structure, the length of the lower flange may be longer than the length of the upper flange at the cross-section orthogonal to the direction in which the beads are lined up. Also in the foregoing structure, the center of the lower flange may rise upward at the cross-section orthogonal to the direction in which the beads are lined up. Moreover in the foregoing structure, the length of the lower flange may be twice as long as the length of the lower vertical wall at the cross-section orthogonal to the direction in which the beads are lined up.

In the foregoing structure, the sectional area of the lower flange may be greater than the sectional area of the upper flange at the cross-section orthogonal to the direction in which the beads are lined up.

In the foregoing structure, an edge portion, when viewed from above, of the upper flange that joins to the outer panel may form a wavy curved line. In this structure, the bead may be a bead having a convex cross-section, and a portion of the upper flange that joins to the upper panel may be a portion where the edge portion widens out so as to be wider than other portions.

In the foregoing structure, the upper flange and the outer panel may be joined with mastic.

In the inner panel according to the foregoing structure, the vertical wall, the lower flange, the vertical wall, and the upper flange are sequentially connected at a cross-section orthogonal to the beads. The vertical wall is formed from an upper vertical wall and a lower vertical wall that is bent with respect to the upper vertical wall. The inclination angle of the upper vertical wall with respect to the upper flange is greater than the inclination angle of the lower vertical wall with respect to the upper flange. As a result, the angle of the bead vertical wall on the outer panel side (i.e., the upper vertical wall) is steeper than the angle of the bead vertical wall on the lower side of the vehicle (i.e., the lower vertical wall). Therefore, when a load is applied to the inner panel upper surface from an impact from above the vehicle, the bead vertical wall does not easily deform so localized deformation of the inner panel upper surface can be suppressed. As a result, the area of the hood that deforms as a result of a head impact at the onset of a collision, i.e., the weight, increases so the first acceleration wave can be increased. Also, the lower vertical wall of the bead formed on the inner panel is inclined such that the inclination angle between it and the upper flange is smaller than the inclination angle between the upper vertical wall and the upper flange. Therefore, when the inner panel deforms and hits an internal part such as an engine beneath the hood resulting in a load being applied from below the vehicle, the lower vertical wall becomes angled in the relative direction of the impact from the internal part. Accordingly, the deformation load when the hood inner panel contacts the internal part in the later stage of the collision can be reduced.

According to the foregoing structure, the inner panel resists deformation when a load is applied to the inner panel upper surface from above the vehicle from a collision with a pedestrian. As a result, the first acceleration wave can be increased. Also, the deformation load when the inner panel contacts an internal part located beneath the hood, such as an engine, can be decreased in the later stage of the collision. As a result, pedestrian protection is improved.

BRIEF DESCRIPTION OF THE DRAWINGS

The features, advantages, and technical and industrial significance of this invention will described in the following detailed description of example embodiments of the invention with reference to the accompanying drawings, in which like numerals denote like elements, and wherein.

DETAILED DESCRIPTION OF THE PREFERRED EMBODIMENTS

Figure 1:
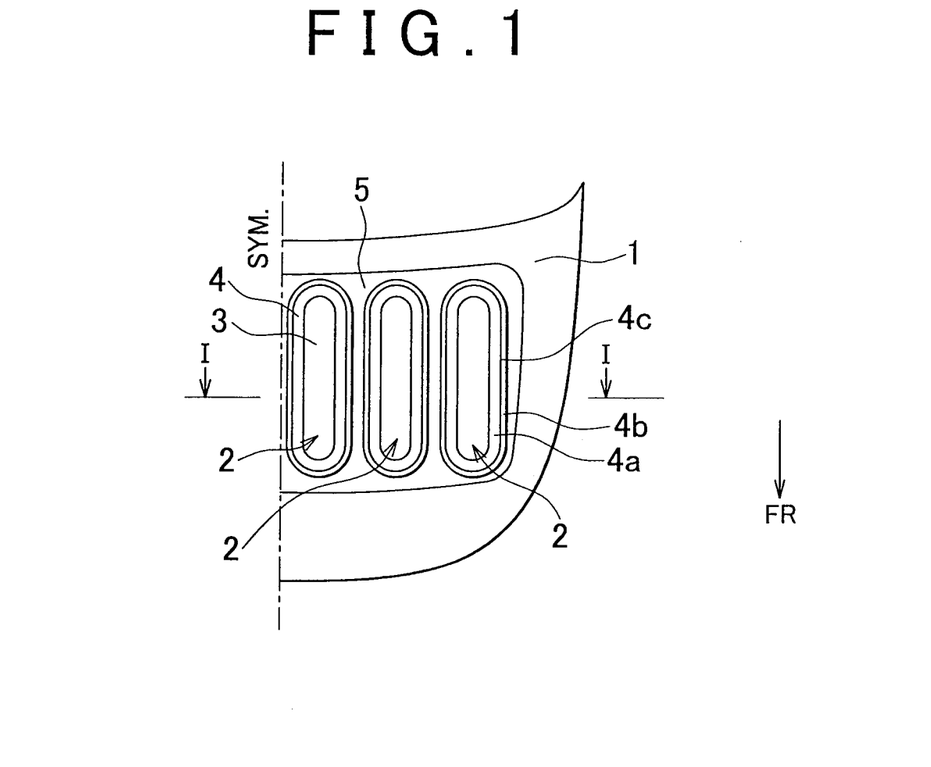
FIG. 1 is a plan view of a vehicle flange according to one example embodiment of the invention.
Figure 2:
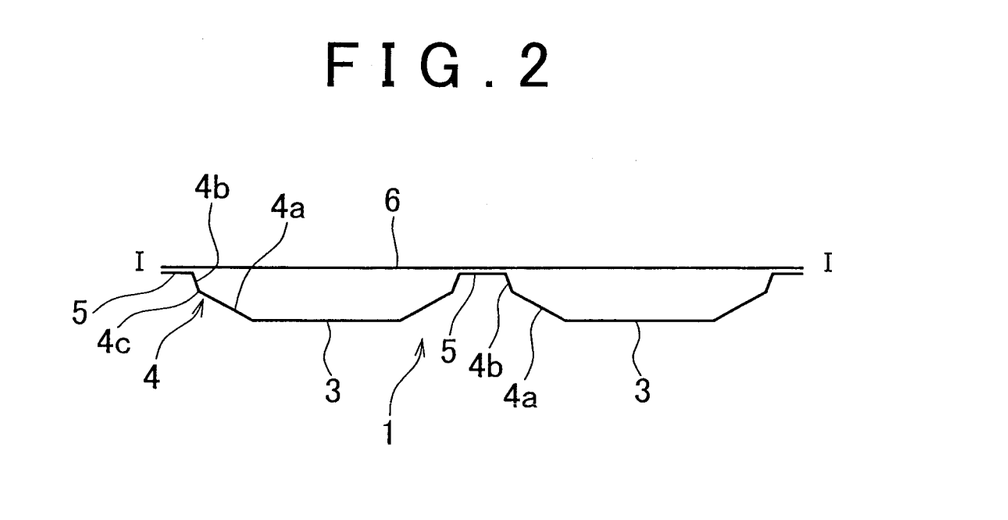
FIG. 2 is a sectional view taken along line I-I in FIG. 1 (i.e., a sectional view in the vehicle width direction)

Hereinafter, example embodiments of the invention will be described in more detail with reference to the appended drawings. FIG. 1 is a plan view of the left half (in the direction of vehicle travel which is indicated by the arrow FR in the drawing) of an inner panel according to one example embodiment of the invention. FIG. 2 is a sectional view showing a portion of a cross-section taken along line I-I in FIG. 1, and FIGS. 3A to 3C are views showing the shape of a vertical wall. As shown in FIG. 2, a vehicle hood is such that an outer panel 6 arranged above and on the outside overlaps with an inner panel 1 arranged below and on the inside. The outer panel 6 and the inner panel 1 are joined at the outer edges and a space is formed inside between the two.

As shown in FIG. 1, a plurality (three are shown on the left half in the drawing) of beads 2 which extend in the longitudinal direction of the vehicle are formed generally parallel with each other lined up in the vehicle width direction. Each of these beads 2 has an upper flange 5, a vertical wall 4, a lower flange 3, and a vertical wall 4 formed connected in this order at a cross section that is orthogonal to the bead. For example, the beads 2 may be i) beads having convex cross-sections in the vehicle width direction which are formed at appropriate intervals on a bead forming surface of the inner panel on which the beads are formed, ii) beads having convex cross-sections in the vehicle width direction which are formed alternately with beads having concave cross-sections in the vehicle width direction on the bead forming surface, or iii) beads having concave cross-sections in the vehicle width direction which are formed at appropriate intervals on the bead forming surface. In this example embodiment, the inner panel 1 has a bottom portion and a bead forming surface that connects with an upper edge of a vertical wall that rises from the bottom portion. The upper flange 5 functions as the bead forming surface of the inner panel 1. Therefore, the lower flange 3 is shaped protruding downward from the bead forming surface. That is, the bead 2 has a concave cross-section with respect to the reference surface of the inner panel 1. The upper flange 5 is joined with mastic to the inner surface of the outer panel 6 above the upper flange 5.

Figure 3A:
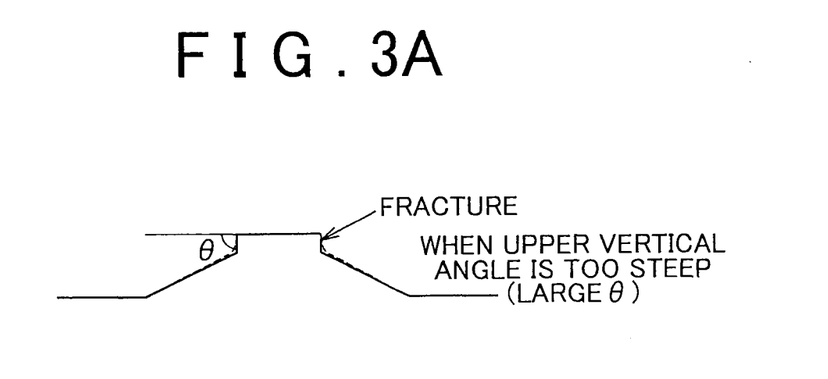
FIGS. 3A to 3C are views showing frame formats of different inclination angles of an upper vertical wall.
Figure 3B:
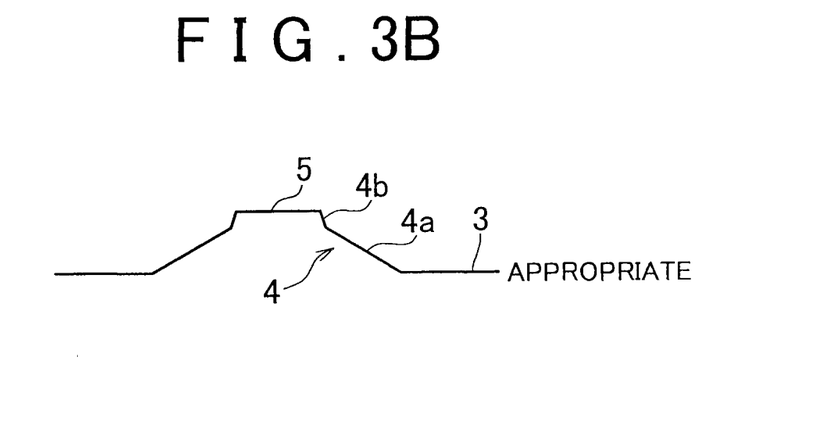
Figure 3C:
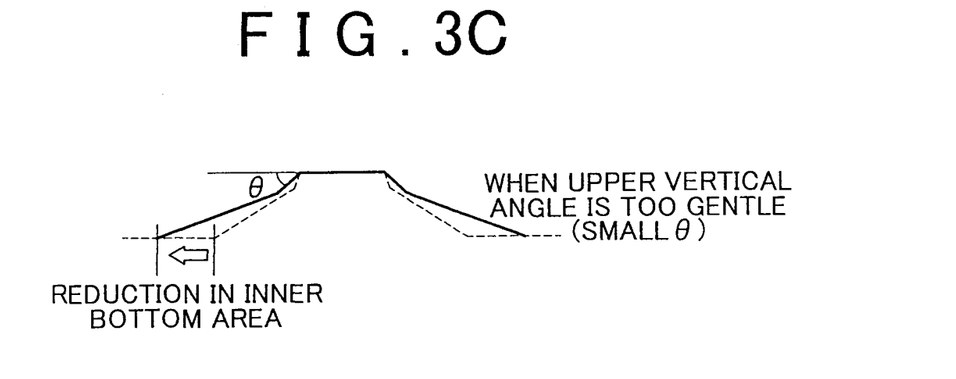

The vertical wall 4 is formed by a lower vertical wall 4a below and an upper vertical wall 4b above. The lower vertical wall 4a and the upper vertical wall 4b are both flat surfaces and the boundary between the two is a bent portion (bend line 4c). As shown in FIGS. 2 and 3, the inclination angle between the upper vertical wall 4b and the upper flange 5 is greater than the inclination angle between the lower vertical wall 4a and the upper flange 5. The angle (θ) between the upper vertical wall 4b and the upper flange 5 is preferably between 40° and 60° inclusive. Also, the position of the bent portion (i.e., the bend line 4c) is more than ½ of the way between the lower flange 3 and the upper flange 5 so as to be closer to the upper flange 5 than the lower flange 3. Moreover, the length of the lower flange 3 is greater than the length of the upper flange 5.

Figure 4A:
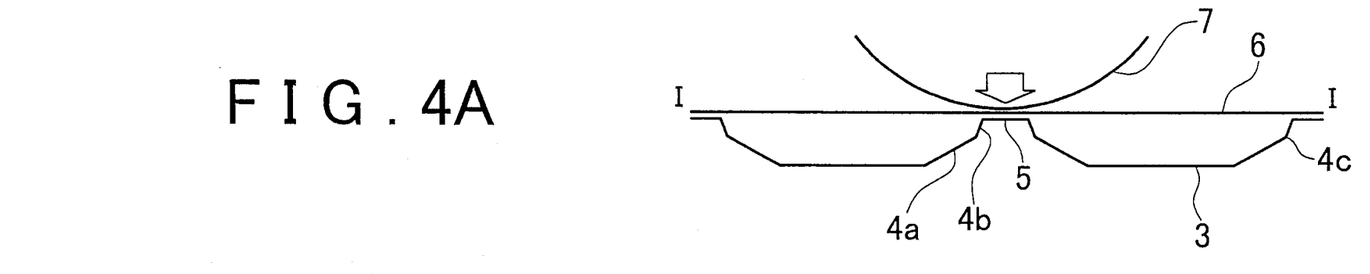
FIGS. 4A and 4B are views illustrating the operation of the example embodiment, which show frame formats of deformation of an inner panel when a load from the head of a pedestrian is applied.
Figure 4B:
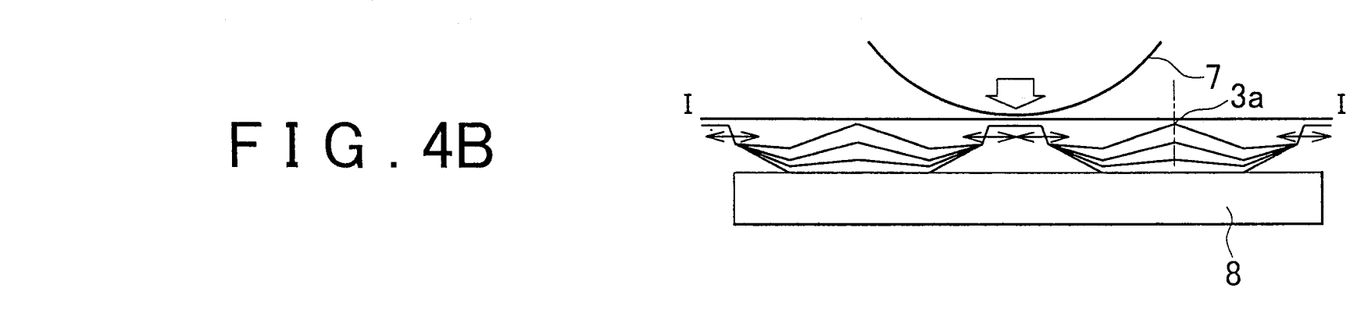

Next, the operation of the inner panel of this example embodiment structured as described above will be described. As shown in FIG. 4A, when the head 7 of a pedestrian collides with the outer panel 6 during a collision with the pedestrian, the head 7 of the pedestrian pushes the upper flange 5 of the inner panel 1 downward as shown in FIG. 4B. That is, on impact, a downward load is applied to the upper flange 5. As a result, the area of the hood near the impact moves downward such that the lower flange 3 comes into contact with internal parts 8 arranged beneath the hood resulting in a load that vertically compresses the beads 2 being applied between the upper flange 5 and the lower flange 3. In this case, because the upper vertical wall 4b of the vertical wall 4 is a steep wall having a large angle between it and the upper flange 5, the upper vertical wall 4b will not deform much from an impact load. In contrast, the angle between the lower vertical wall 4a and the upper flange 5 is small so when an impact load is applied, the lower vertical wall 4a deforms easily. By having the lower vertical wall 4a deform, a pair of the lower vertical walls 4a push the lower flange 3 in between in the horizontal direction such that the lower flange 3 deforms by its center portion raising as shown in FIG. 4B. As a result, an indentation 3a is formed at the center of the lower flange 3.

The angle between the upper flange 5 and the upper vertical wall of the bead (i.e., the upper vertical wall 4b) is made steeper than the angle between the upper flange 5 and the lower vertical wall of the bead (i.e., the lower vertical wall 4a). Therefore, when a load is applied to the inner panel upper surface from above the vehicle during a collision, the upper vertical wall 4b does not easily deform from the impact so localized deformation of the inner panel upper surface can be suppressed. As a result, the area of the hood that deforms during a head impact at the onset of a collision, i.e., the weight, increases so the first acceleration wave can be increased. Also, the lower vertical wall 4a of the bead 2 that is formed on the inner panel 1 is inclined gently with respect to the upper flange 5. Therefore, when the inner panel 1 deforms and hits an internal part 8 such as an engine beneath the hood resulting in a load being applied from below, the lower vertical wall 4a deforms easily by becoming angled in the relative direction of the impact from the internal part 8. Accordingly, the deformation load when the hood inner panel 1 contacts the internal part 8 in the later stage of the collision can be reduced, thereby enabling the second acceleration wave to be reduced.

As in this example embodiment, the bend line 4c provided in the vertical wall 4 is where the bending deformation of the vertical wall originates upon contact with the internal part 8 and thus can deform easily which enables the deformation initiating load to be reduced. At the same time, as shown in FIG. 4B, the bend line 4c easily shifts to the left and right. The line at the cross-section of the inner panel 1 in the vehicle width direction is longer than the outer panel 6 so there is a surplus of material when it is crushed. However, because the bend line 4c moves left and right, the surplus of material can be easily absorbed, making it possible to delay a load with a sharp bottom in the second acceleration wave (i.e., a load relatively applied from the internal part 8 to the lower flange 3) from being generated.

Incidentally, similar to the invention, as related art that attempts to improve pedestrian protection performance by revising the cross-sectional shape of the beads, JP-A-2006-44543 describes a structure that provides a flat part midway in the vertical wall. However, because the bead structure of the invention does not require such a flat part midway in the vertical wall, the area of the inner panel bottom surface is able to be larger than it is in with the cross-section having the flat part. As a result, the flexural rigidity of the panel itself increases so the acceleration immediately after the first wave increases and more energy can be absorbed at the onset of the collision.

The inclination angle of the upper vertical wall 4b on the upper side of the vehicle serves to support the deformation of the upper flange 5. A steeper angle of this upper vertical wall 4b results in increased resistance to deformation against a load from above the vehicle. That is, a steep angle of the upper vertical wall 4b on the upper side of the vehicle minimizes localized deformation of the upper flange, and is therefore effective in increasing the first acceleration wave.

However, to prevent fracturing during press-forming it is preferable that the upper vertical wall angle be no more than 60°. If the upper vertical wall angle is greater than 60°, as shown in FIG. 3A, the boundary between the upper flange and the upper vertical wall may fracture during press-forming. Also, if the upper vertical wall angle is too gradual, as shown in FIG. 3C, the bottom surface area of the lower flange 3 of the inner panel 1 decreases and the panel flexural rigidity itself decreases. Therefore, the upper vertical wall angle is preferably at least 40°.

Figure 5:
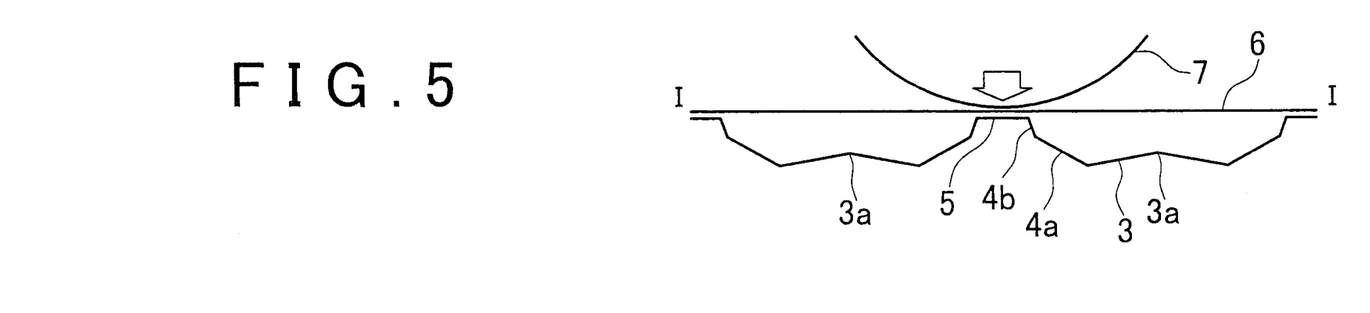
FIG. 5 is a sectional view in the vehicle width direction showing a vehicle flange according to a modified example of the example embodiment of the invention.

Further, as described above, the lower flange 3 deforms such that its center portion rises upon impact in an attempt to absorb the surplus of material. In order to facilitate the start this deformation even more and thus reduce the second acceleration wave, a modified example of the example embodiment of the invention provides a pre-formed indentation 3a by deforming the inner panel 1 so that the center portion of the lower flange 3 is bent upward, as shown in FIG. 5.

Figure 6A:
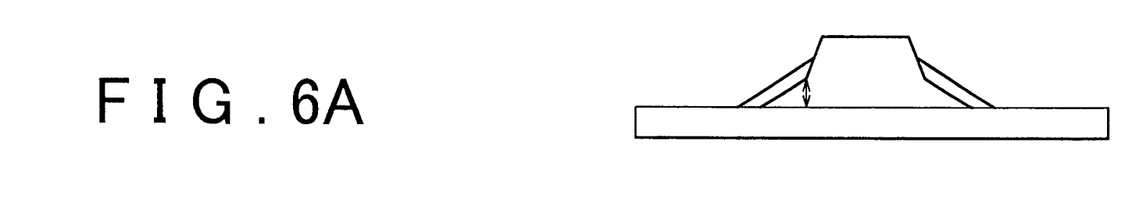
FIGS. 6A to 6C are views showing the relationship between the distance between an upper flange and a lower flange, and the position of a bend line.
Figure 6B:
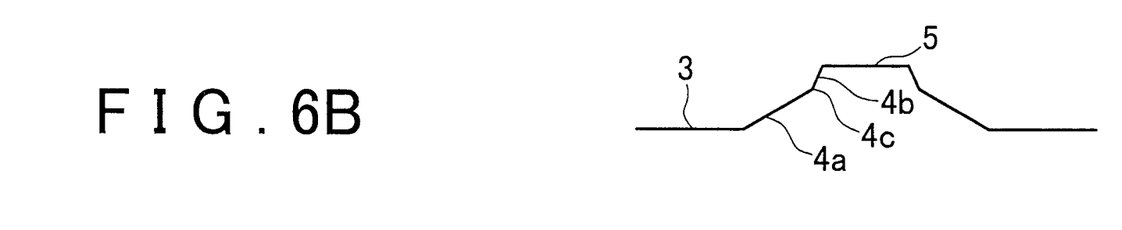
Figure 6C:
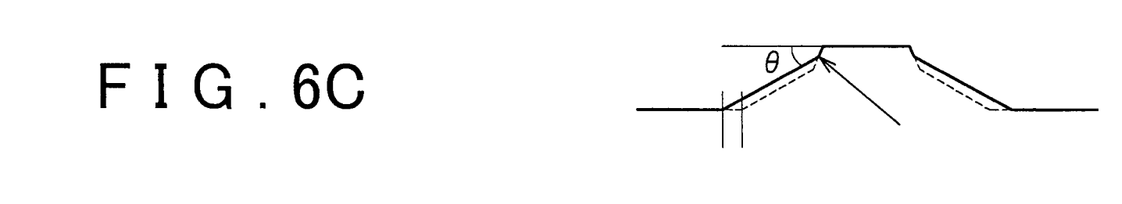

As described above, the position of the bent portion (the bend line 4c) is above ½ way between the lower flange 3 and the upper flange 5 so as to be closer to the upper flange 5 than the lower flange 3, as shown in FIG. 6B. To lengthen the crushable stroke of the inner panel 1, the position of this bend line 4c is preferably at least higher than the center (½) between the lower flange 3 and the upper flange 5 of the inner panel 1 so as to be closer to the upper flange 5 than the lower flange 3, and more preferably, in a position approximately ⅓ of the way between the lower flange 3 and the upper flange 5 of the inner panel 1. As shown in FIG. 6A, when the bend line 4c is positioned low, the upper vertical wall 4b on the vehicle upper side contacts the internal part 8 more quickly such that the second acceleration wave starts earlier. Also, as shown in FIG. 6C, when the bend line 4c is too high, the area of the bottom surface (the lower flange 3) of the inner panel 1 is reduced so the panel flexural rigidity is lower. As a result, after the first acceleration wave, the acceleration sharply decreases so less energy is absorbed at the onset of the collision.

Figure 7:
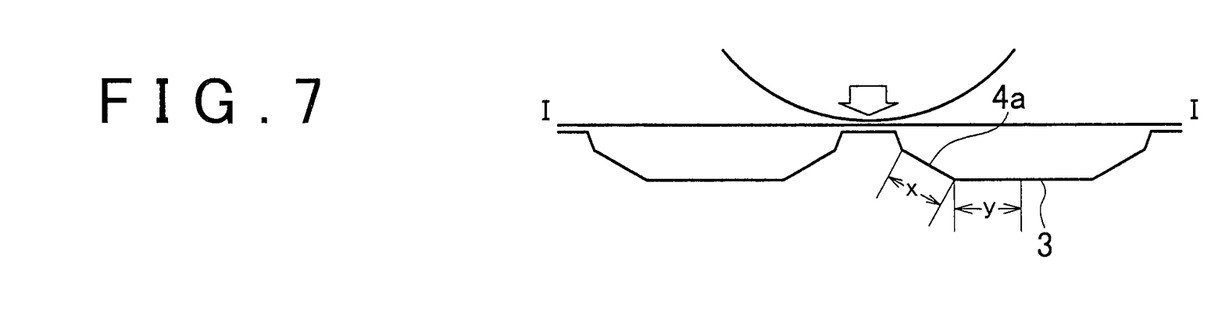
FIG. 7 is a view showing the relationship between the length of the lower vertical wall and the length of the lower flange.

Meanwhile, as shown in FIG. 7, in a cross-section in the vehicle width direction, it is desirable that the length x of the lower vertical wall 4a in the direction along the surface of the lower vertical wall 4a be equal to y which is ½ of the length of the lower flange 3. Making these lengths generally equal results in the deformation resistance of the lower flange and the lower vertical wall being substantially equal so crush deformation can progress as easily as possible, thus enabling the deformation load to be reduced.

Also, the flexural rigidity as a panel can be evaluated by the geometrical moment of inertia of the hood having the closed cross-section structure formed by the outer panel and the inner panel. When the heights of the cross-sections are the same, the geometrical moment of inertia is increased by providing material in a position far from the neutral axis of flexural. Because the outer panel is arranged on the upper side of the hood, the geometrical moment of inertia increases when the sectional area of the lower flange 3 rather than the upper flange 5 is made larger with the inner panel. If the flexural rigidity of the panel itself is increased, the hood area (mass) that is displaced at the onset of the collision increases which enables the first acceleration wave and the acceleration immediately after the first wave to be increased. As a result, the energy absorbing stroke at impact can be reduced.

Figures 8A, 8B, 8C:
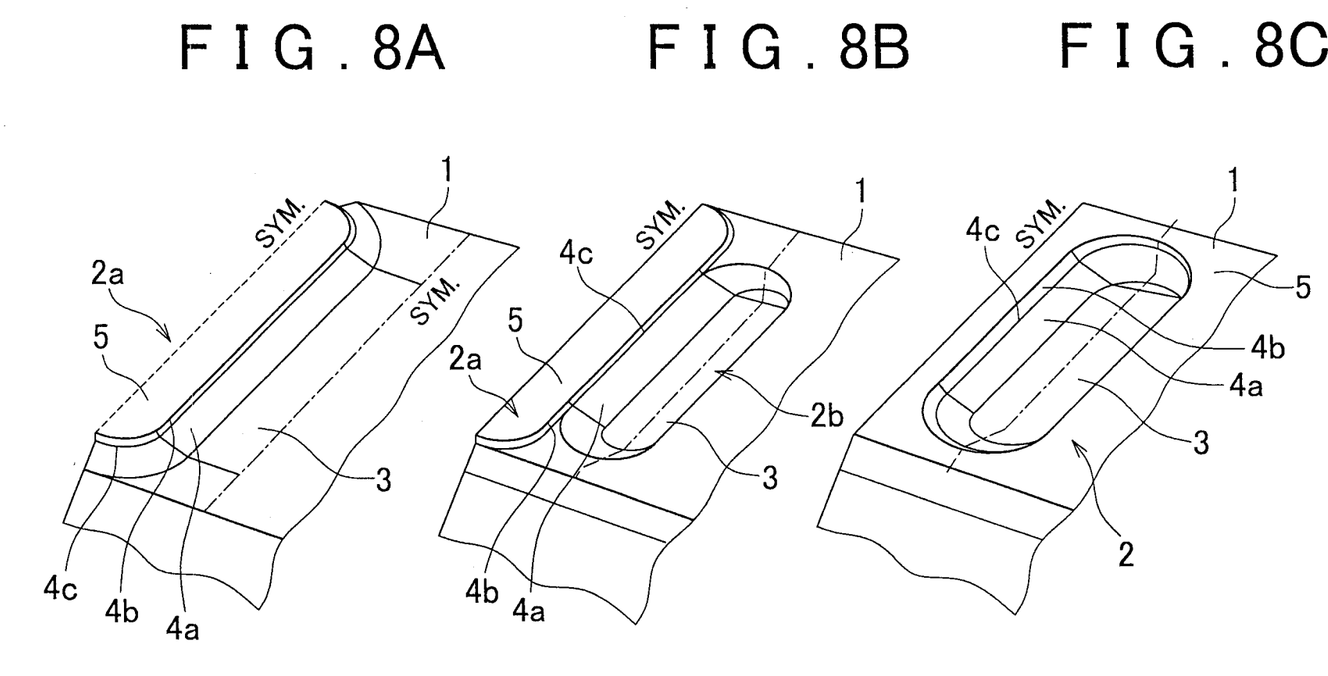
FIGS. 8A to 8C are perspective views of the example embodiment in which beads are connected in the vehicle width direction.

The bead 2 shown in FIGS. 1 to 7 protrudes downward from the reference surface of the inner panel 1 (i.e., is concave with respect to that reference surface), and the portion that serves as that reference surface of the inner panel 1 is between adjacent beads 2, as shown in FIG. 8C. Therefore, the portion between the upper vertical walls 4b of adjacent beads 2 is the reference surface of the inner panel 1 and serves as the upper flange 5.

However, as shown in FIG. 8A, a bead 2a can also protrude upward from the reference surface of the inner panel 1. Accordingly in this case, the portion of the reference surface of the inner panel 1 is between the lower vertical walls 4a of adjacent beads 2a and serves as the lower flange 3. Also, as another modified example, a bead 2a that protrudes upward (i.e., a convex bead 2a) and a bead 2b that protrudes downward (i.e., a concave bead 2b) may be connected in the vehicle width direction in such a way that there is no portion of the reference surface of the inner panel 1 between the two, as shown in FIG. 8B. In this case, the bottom surface of the concave bead 2b that protrudes downward serves as the lower flange 3 and the upper surface of the convex bead 2a that protrudes upward serves as the upward flange 5. The structures of these modified examples also yield the effects of the invention insofar as they satisfy the structure set forth in the scope of the invention.

Figure 9A:
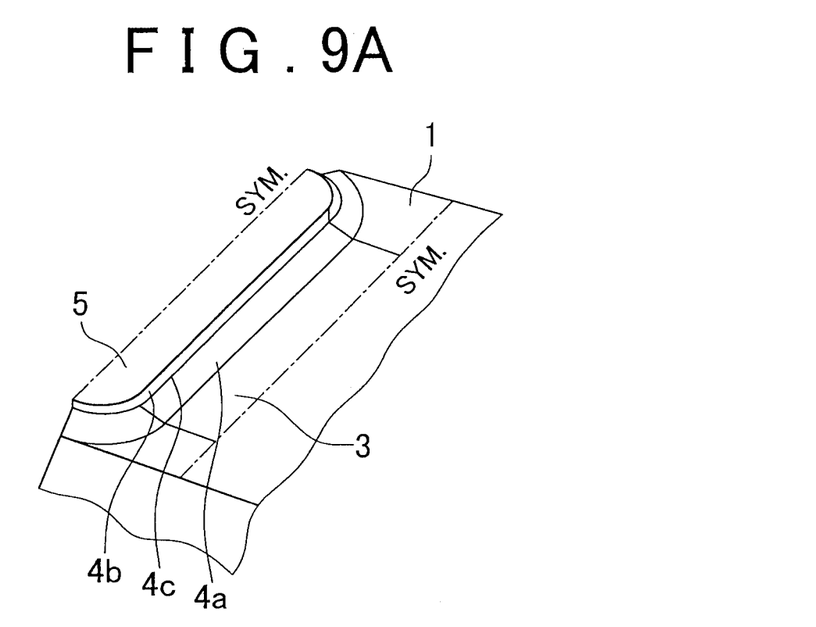
FIGS. 9A and 9B are perspective views of another modified example of the example embodiment in which the edge portion of the upper flange is formed in a wavy curved line.
Figure 9B:
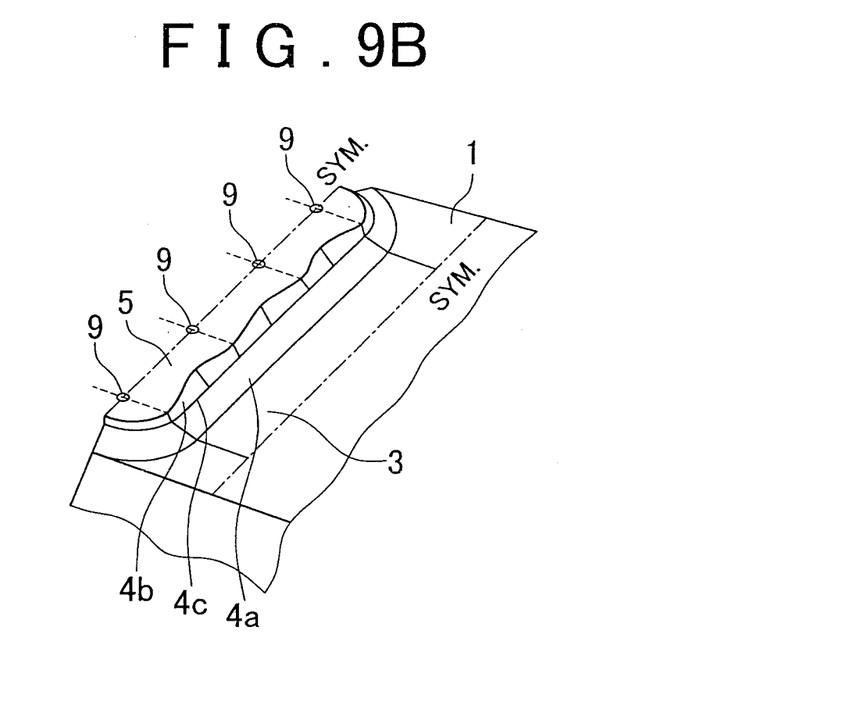

Similar to FIGS. 8A to 8C, FIG. 9A shows the bend line 4c, which is the boundary between the upper vertical wall 4b that connects with the upper flange 5 and the lower vertical wall 4a that connects with the lower flange 3, formed in a straight line when viewed from above. In contrast, the edge portion of the upper flange 5 in the width direction of the flange can be formed in a wavy shape in the longitudinal direction of the flange, and the angle of the upper vertical wall 4b between the bend line 4c which is formed in a straight line when viewed from above and this upper flange edge portion can be curved, as shown in FIG. 9B. That is, the direction of the surface of the upper vertical wall 4b can be changed in the longitudinal direction of the bead to increase the inclination angle of the upper vertical wall 4b between the edge portion at the widest portion of the upper flange 5 and the bend line 4c and decrease the inclination angle of the upper vertical wall 4b between the edge portion at the narrowest portion of the upper flange 5 and the bend line 4c.

This makes it possible to even more reliably prevent localized deformation of the upper flange 5 of the inner panel 1. When the head of a pedestrian collides with the vehicle hood and the load of that impact is applied to the upper flange 5 of the inner panel 1, the resistance of the upper flange 5 to bending deformation is increased when the edge portion (edge line) of the upper flange 5 is curved. Meanwhile, the inner panel 1 is easily deformed by a load applied to the inner panel 1 from below when the bend line 4c and the boundary line between the lower flange 3 and the lower vertical wall 4a are formed in straight lines when viewed from above.

Accordingly, deformation of the upper flange 5 is suppressed while deformation of the lower flange 3 is promoted. As a result, deformation of the upper flange 5 at the onset of a collision is suppressed thereby enabling the first acceleration wave to be increased, while deformation of the lower flange 3 in the later stage of the collision is promoted thereby reducing the second acceleration wave.

In this way, the upper vertical wall 4b above the bend line 4c is a connecting body with a gently curved surface such that this bead will not deform under a load from above as easily as a bead in which the upper vertical wall 4b is a flat surface. As shown in FIG. 9B, by forming a portion of that is joined with mastic to the outer panel 6 above the upper flange 5 of the inner panel 1, i.e., a mastic seat surface 9, on a wide portion of the upper flange 5, the area of the mastic seat surface 9 can be kept sufficiently large while the area of the upper flange 5 can be made as small as possible. As a result, the flexural rigidity of the inner panel 1 itself can be increased so the first acceleration wave can be made even larger.

Similar effects can also be obtained when providing concave and convex portions such as shape fixing beads on the edge line of the upper flange 5. However, the area near the edge line of the upper flange 5 is a portion where there is a concentration of flexure during press-forming so forming a portion with a drastically different shape at this portion increases the likelihood of fracture at this portion. Also, if a portion with a drastically different shape is provided, open deformation during a collision may be completely prevented, thus increasing the uncrushed area when the hood is crushed. Accordingly, it is preferable that the edge line of the upper flange be gently curved so that there is enough leeway for deformation at the later stage of the collision.

The invention claimed is:

1. A vehicle inner panel which, together with an outer panel, forms a vehicle hood, comprising:
    a reference surface; and
    a plurality of beads having at least convex or concave cross-sections with respect to the reference surface, the plurality of beads being formed parallel with one another and extending in a longitudinal direction of the vehicle, wherein:
    the reference surface surrounds the plurality of beads;
    each bead includes a vertical wall, a lower flange that extends from a bottom edge of the vertical wall, and an upper flange that extends from an upper edge of the vertical wall;
    the vertical wall, the lower flange, the vertical wall, and the upper flange are shaped so as to be successively connected at a cross-section orthogonal to the direction in which the beads are lined up;
    the vertical wall is formed from an upper vertical wall and a lower vertical wall that is below and bent with respect to the upper vertical wall;
    an inclination angle of the upper vertical wall with respect to the upper flange is greater than an inclination angle of the lower vertical wall with respect to the upper flange;
    a bent portion between the upper vertical wall and the lower vertical wall of the beads is positioned more than half way between the lower flange and the upper flange so as to be closer to the upper flange than the lower flange and partially extends continuously in a straight line shape along a longitudinal direction of the bead; and
    the upper flange is joined to the outer panel.

2. The vehicle inner panel according to claim 1, wherein the inner panel has a bottom portion serving as the lower flange and a bead forming surface that serves as the upper flange and is connected to the upper edge of the vertical wall that rises from the bottom portion; the beads are such that, at the cross-section orthogonal to the direction in which the beads are lined up, beads having concave cross-sections are formed at intervals on the bead forming surface of the inner panel.

3. A vehicle inner panel which, together with an outer panel, forms a vehicle hood, comprising:
    a reference surface; and
    a plurality of beads having at least convex or concave cross-sections with respect to the reference surface, the plurality of beads being formed parallel with one another and extending in a longitudinal direction of the vehicle, wherein:
    each bead includes a vertical wall, a lower flange that extends from a bottom edge of the vertical wall, and an upper flange that extends from an upper edge of the vertical wall;
    the vertical wall, the lower flange, the vertical wall, and the upper flange are shaped so as to be successively connected at a cross-section orthogonal to the direction in which the beads are lined up;
    the vertical wall is formed from an upper vertical wall and a lower vertical wall that is below and bent with respect to the upper vertical wall;
    an inclination angle of the upper vertical wall with respect to the upper flange is greater than an inclination angle of the lower vertical wall with respect to the upper flange;
    a bent portion between the upper vertical wall and the lower vertical wall of the beads is positioned more than half way between the lower flange and the upper flange so as to be closer to the upper flange than the lower flange and partially extends continuously in a straight line shape along a longitudinal direction of the bead;
    the upper flange is joined to the outer panel; and
    the beads are such that a bead having a convex cross-section and a bead having a concave cross-section are formed alternately at the cross-section orthogonal to the direction in which the beads are lined up.

4. The vehicle inner panel according to claim 1, wherein the inner panel has a bead forming surface that serves as the lower flange and connects with the bottom edge of the vertical wall, and the beads are such that beads having convex cross-sections are formed at appropriate intervals on the bead forming surface of the inner panel at the cross-section orthogonal to the direction in which the beads are lined up.

5. The vehicle inner panel according to claim 1, wherein the bent portion is positioned one-third of the way between the upper flange and the lower flange so as to be closer to the upper flange than the lower flange.

6. The vehicle inner panel according to claim 1, wherein the angle formed between the upper vertical wall and the upper flange is between 40° and 60° inclusive.

7. The vehicle inner panel according to claim 1, wherein the length of the lower flange is greater than the length of the upper flange at the cross-section orthogonal to the direction in which the beads are lined up.

8. The vehicle inner panel according to claim 1, wherein a center of the lower flange rises upward at the cross-section orthogonal to the direction in which the beads are lined up.

9. The vehicle inner panel according to claim 1, wherein the length of the lower flange is twice the length of the lower vertical wall at the cross-section orthogonal to the direction in which the beads are lined up.

10. The vehicle inner panel according to claim 1, wherein a sectional area of the lower flange is greater than a sectional area of the upper flange at the cross-section orthogonal to the direction in which the beads are lined up.

11. The vehicle inner panel according to claim 1, wherein an edge portion, when viewed from above, of the upper flange that joins to the outer panel forms a wavy curved line.

12. The vehicle inner panel according to claim 11, wherein the beads comprise a bead having a convex cross-section, and a portion of the upper flange that joins to the outer panel is a portion where the edge portion widens out so as to be wider than other portions.

13. The vehicle inner panel according to claim 1, wherein the upper flange and the outer panel are joined with mastic.

* * * * *